United States Patent [19]

Vogelgesang et al.

[11] Patent Number: 4,812,633

[45] Date of Patent: Mar. 14, 1989

[54] OPTICAL DATA CARD

[75] Inventors: Peter J. Vogelgesang; John W. Ulseth, both of Roseville; Norman L. Giorgini, W. St. Paul; Jathan D. Edwards, Oakdale, all of Minn.

[73] Assignee: Minnesota Mining and Manufacturing Company, St. Paul, Minn.

[21] Appl. No.: 179,318

[22] Filed: Apr. 8, 1988

[51] Int. Cl.⁴ .............................................. G06K 19/00
[52] U.S. Cl. .................................... 235/487; 235/492; 235/493
[58] Field of Search ...................... 235/487, 492, 493

[56] References Cited

U.S. PATENT DOCUMENTS 4,772,872 9/1988 Nonat ............................. 235/492 X Primary Examiner—Harold I. Pitts
Attorney, Agent, or Firm—Donald M. Sell; Walter N. Kirn; Douglas B. Little

[57] ABSTRACT

A wallet-sized data card includes a magneto-optic active region configured for rotational recording of data. A fender projecting outwardly from the card is disposed adjacent an outer circumference of the recording region for protecting the magneto-optic recording region.

13 Claims, 2 Drawing Sheets

OPTICAL DATA CARD

FIELD OF THE INVENTION

The present invention relates to a wallet-size data card, and in particular, it relates to a data card having a magneto-optic layer for storage and retrieval of information thereon.

BACKGROUND OF THE INVENTION

Wallet-size cards are in widespread and general use as credit cards, identification cards, passes, membership cards, driver's licenses and the like. Such cards are typically made of a solid plastic or a plastic laminate and carry visible indicia, plus embossed and/or raised characters which carry the person's identification, the card's identification and other information. Such cards are used in imprinting devices for imprinting sales receipts. In addition, most of such cards carry magnetic strips which contain limited amounts of digitally encoded data. The cards are inserted whole into a reader, such as in an automatic teller machine, or one edge portion of the card containing the strip is passed through a reader, such as a credit card reader.

In recent years, there has been a great deal of work done in the area of optical recording media, the equipment to record and read such media, and the form or substrate on which the media are deposited. One form of an optical recording element is a disk which includes a groove pattern that is embossed on one side of the substrate. The grooves consist of a series of concentric circles or alternatively a continuous spiral. To read such disks, readers rotate the disk while a focussed laser beam is utilized to read information stored on the disk.

Another form of an optical recording device includes a strip format of optical recording media. Such strip formats on wallet-size cards are disclosed in the Drexler U.S. Pat. Nos. 4,500,777, 4,542,288, 4,544,835, 4,680,460, 4,680,458 and 4,680,456.

As described in the Drexler '777 patent, the laser recording medium is approximately 15 mm wide and extends the length of the card. The strip is applied to the card by an adhesive and is covered by a transparent laminating sheet which serves to keep the strip of laser recording medium flat as well as protecting the strip from dust and scratches. The card is read by moving the card linearly with respect to a laser beam.

The Bouldin U.S. Pat. No. 4,463,089 mentions several configurations for optical recording media including a disk format, square sheet-like material with a central hub, and a non-rotating rectangular plate.

The Drexler et al. U.S. Pat. No. 4,543,307 describes a method for protecting optical surfaces of an optical recording tape by coating the edges of the surface. Alternatively, the edges of the tape may be deformed by embossing the surface such as to create raised protuberances.

SUMMARY OF THE INVENTION

A wallet-sized data card includes a magneto-optic active region configured for rotational recording and reading of data. A fender projecting outwardly from the card is disposed adjacent an outer circumference of the recording region for protecting the magneto-optic recording region.

DETAILED DESCRIPTION OF THE PREFERRED EMBODIMENTS

Figure 1:
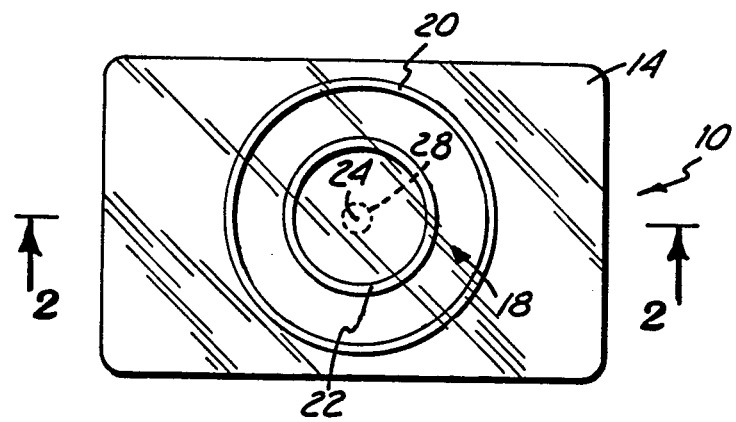
FIG. 1 is a top view of the card of the present invention.
Figure 2:
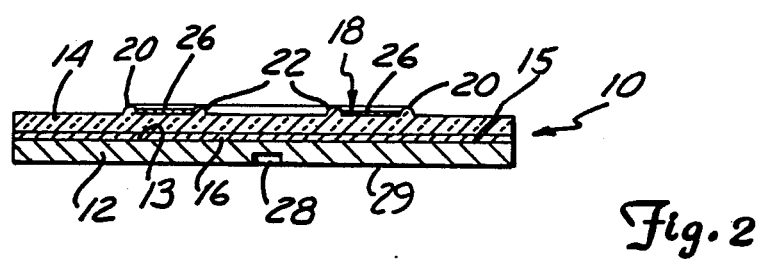
FIG. 2 is a cross-sectional side view of the card of the present invention taken along the line 2—2 in FIG. 1.

A first embodiment of a card of the present invention is generally indicated at 10 in FIGS. 1 and 2. The card 10 includes an opaque layer 12, a transparent layer 14 and a magneto-optic layer 16 disposed between the transparent layer 14 and the opaque layer 12. The layers 12, 14, and 16 are affixed together to form the laminated card 10.

As used herein, the term transparent means sufficiently transmissive to the laser light used in a read/write apparatus to allow such light to pass through and affect the magneto-optic layer in the intended way, e.g., raising its temperature to the compensation or curie temperature at a spot to allow recording a data bit.

Preferably, the layer 12 is an injection molded plastic sheet. Although the layer 12 is preferably opaque, the layer 12 can be transparent. A groove pattern is formed on the layer 12 on a side 13 or layer 14 on side 15 adjacent the magneto-optic layer 16. The groove pattern is a conventional type of groove pattern and can consist of either a series of concentric circles for random access to data, or a continuous spiral where a continuous data stream is desired. The grooves optionally include track I.D. and sector I.D. codes to facilitate data access to information in the same manner as conventional optical disks. When the layers 12, 14 and 16 are bound together, the limits of the groove pattern are defined by fenders 20 and 22. The fender 20 defines the outer diameter of the groove pattern and the fender 22 defines the inner diameter of the groove pattern.

The magneto-optic layer is deposited on the surface of the layer 12 or layer 14 containing the groove pattern. Magneto-optical thin film recording media and deposition processes are described in the Gardner U.S. Pat. No. 4,615,944. The deposition of such media as thin films on substrates is known in the art. In the embodiment illustrated, the magneto-optic layer 16 covers the entire surface 13. Alternatively, the magneto-optical layer may be deposited on a top surface 15 of the layer 14. However, it is sufficient that the magneto-optic layer 16 is deposited such that the layer 16 covers the area circumscribed by fender 20.

The transparent layer 14 serves at least two purposes. First, the transparent layer 14 protects the magneto-optic layer 16 from being scratched. Second, the transparent layer 14 serves as a dust defocusing layer; that is dust particles that adhere to the surface of the layer 14 are positioned from the magneto-optic layer such that interference which may be caused by the particles with reading of or writing on the magneto-optic layer is minimized.

In one embodiment, the transparent layer 14 is injection molded and has a transparent and flat surface. The layer 14 needs to be optically clear and flat over only the active area 18.

A readable and writeable magneto-optic active area 18 is defined between the fenders 20 and 22. The fenders 20 and 22 are concentrically disposed about a central axis 24. The fenders extend outwardly from the layer 14, preferably from about 0.025 CM to about 0.0762 CM.

The fenders 20 and 22 do not interfere with optically writing on or reading off of the card 10. The fenders prevent the active area 18 from coming into contact with another surface, such as an adjacent card in a wallet or on the surface of a table or a desk on which the card may be placed. Preventing such contact minimizes the chances of the surface of the layer 14 between the fenders from being scratched. Scratches and other types of abrasions on the surface of the layer 14 may affect the reading and writing characteristics of the magneto-optic layer.

In one working example of the present invention, the radial distance between the fenders is about 0.953 CM. The radial distance between the fenders requires a high level of localized pressure to bend or deform the card to such an extent that the active layer is exposed to contact with a foreign object or surface.

To add further protection against abrasion, the active area 18 is coated with a hardcoat polymer layer 26, as best illustrated in FIG. 2. Hard coat polymers which are applied to surfaces for abrasion resistance are well known. A non-birefringent, transparent coating composition which adheres well to layer 14 is preferred. One such composition, believed to be a multi-functional acrylate mixed with a monomer containing an N-vinyl amido group such as N-vinyl-2-pyrrolidone and obtained as GAFGARD 233D from GAF Corp. has been used in forming layer 26. This composition was cured with ultraviolet light after applying it to active area 18.

A registration depression or dimple 28 is disposed on an outer surface 29 of the layer 12. The registration dimple 28 is preferably formed during molding of the layer 12. As best illustrated in FIG. 1, the dimple 28 is disposed about the axis 24 and is the centerpoint for the fenders 22 and 20 and the active area 18.

The card 10 of the present invention is used in association with a machine or device (not shown) that is capable of writing and/or reading the magneto-optic layer in the active area 18. The card may be positioned in the machine by referencing one end portion and one edge portion of the card, as is done with conventional magnetically striped cards. The card is held in a holder and the holder rotated to read the card.

An alternative method of aligning the card of the present invention is to engage a registration dimple 28 of the present invention with a pin (not shown) located within a read/write apparatus (not shown). The engagement of the registration dimple by the pin aligns the magneto-optic active area 18 for proper reading. Alternatively, a hole (not shown) may be used instead of registration of dimple 28.

Figure 3:
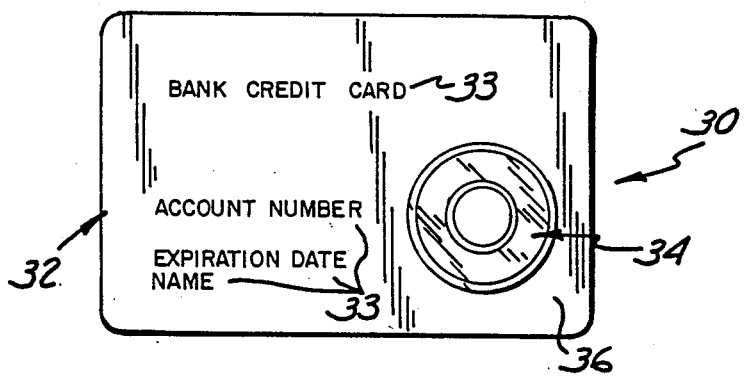
FIG. 3 is a top view of an alternative embodiment of the card of the present invention.

An alternative embodiment of the present invention is generally indicated at 30 in FIG. 3. The card 30 includes a known card blank 32 with a magneto-optic disk 34 affixed to a top surface 36 of the blank 32. The disk 34 is disposed to one side of the card blank 32 to provide ample room for various indicia 33 that are typically found on a bank or credit card.

The optical disk 34 is approximately 2.54 CM in diameter and is capable of storing about three megabytes of data. The card blank 32 of FIG. 4 preferably has a width dimension of approximately 54 mm and a length dimension of approximately 85 mm. These dimensions are typical of credit cards presently used. Such cards easily fit into a wallet and have been adopted as a convenient size for use in automatic teller machines and the like. The card blank is made of a polymeric material such as polyvinylchloride and includes a colorant such as titanium dioxide.

Figure 4:
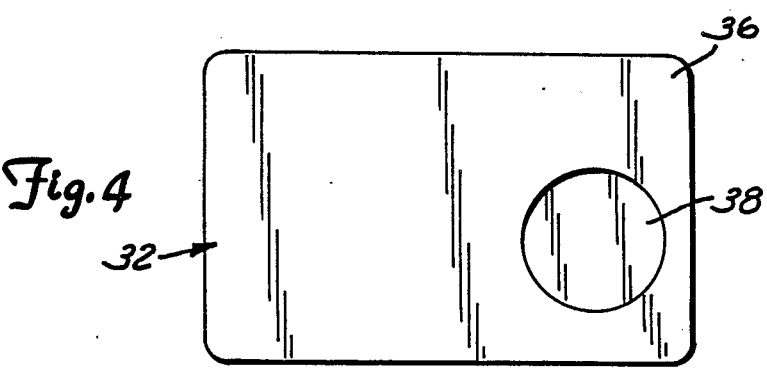
FIG. 4 s a top view of a card blank used to make the card of FIG. 3.
Figure 5:
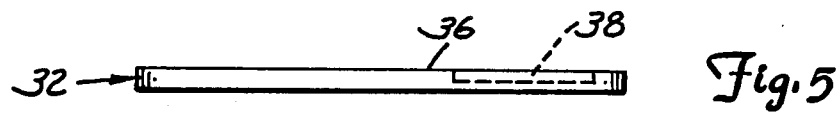
FIG. 5 is a side view of the card blank used to make the card of FIG. 3.

The card blank 32 prior to printing, embossing, and the attachment of the optical disk 34 is illustrated in FIGS. 4 and 5. A circular area 38 is skived, milled, or otherwise formed into the surface 36 of the blank 32. The depth of area 38 should be sufficient to accept the disk 34. In one working embodiment, the depth was approximately 0.076 CM.

Figure 6:
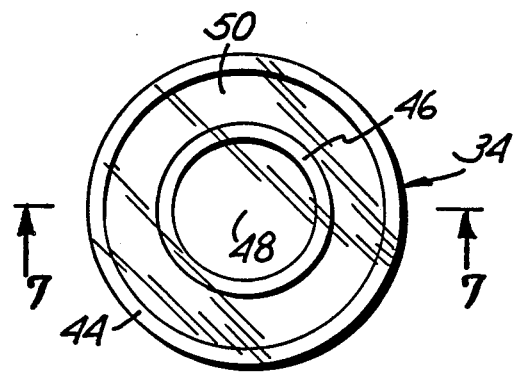
FIG. 6 is a top view of the optical disk of the card illustrated in FIG. 3.
Figure 7:
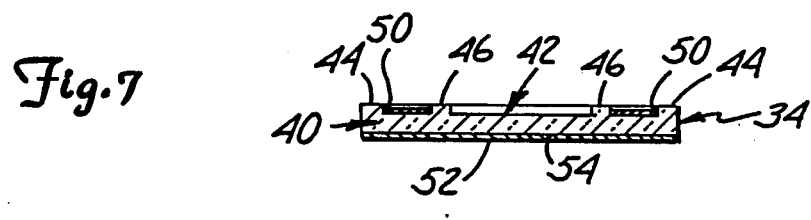
FIG. 7 is a cross-sectional view taken along the line 7—7 in FIG. 6.

The optical disk 34 is illustrated separately in FIGS. 6 through 7. In one embodiment, the optical disk 34 includes a polycarbonate substrate 40 made by injection molding. A top surface 42 is optically smooth and transparent. Circular ridges or fenders 44 and 46 on the top surface 42 are formed during the injection molding of the disk 40. The fenders 44 and 46 are concentrically disposed about an axis 48. An active magneto-optic area 50 in which data is stored is defined between the fenders 44 and 46.

A magneto-optic coating 52 is deposited on a bottom surface 54 of the disk 40 in a manner that is known in the art. Optical tracking grooves are provided in the surface 54 during the molding of the disk 40 and optionally include track and sector identification codes. In one embodiment, the magneto-optic coating 52 comprises several layers (not shown) which are known in magneto-optical media construction. Going from the top of FIG. 7 down, a first layer of $SiO_x$ serves as a chemical barrier and heat insulator. A second layer includes the active magneto-optical thin film recording medium for storing data. A third layer of $SiO_x$ serves as a chemical barrier and heat insulator. A fourth and final layer of aluminum serves as an optical reflecting layer.

The disk 34 is cemented into the area 38 of the card blank 32.

Similar to the fenders of the card illustrated in FIGS. 1 and 2, the fenders 44 and 46 protect the active area 50 from being scratched by surfaces of adjacent cards, tabletop or desk surfaces or a wallet surface. The fenders extend from the disk surface and from the surface of the card about 0.041 CM. The radial difference between the fender 46 and the fender 44 is approximately 0.48 CM and a height of 0.041 CM provides an ample protective barrier for the active area 50.

Figure 8:
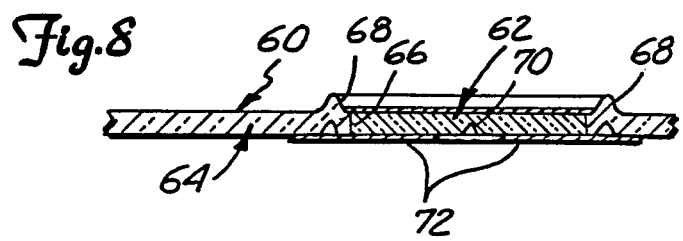
FIG. 8 is a sectional view of a portion of an alternative embodiment of the card of the present invention.

Another alternative embodiment of a card of the present invention is generally indicated at 60 in FIG. 8. The embodiment 60 includes a different manner of affixing an optical disk 62 onto a card blank 64. Instead of providing a skived area as in the card of FIGS. 3 through 7, the card blank has an aperture 66 formed therein. An outer ridge or fender 68, similar to the outer fender 44 is formed in the card blank 64 instead of in the optical disk. The disk 62 is similar in all respects to the disk 34 described previously with the exception that no fenders are molded in the polycarbonate substrate. The same layers are deposited on the substrate to form the active magneto-optic area as previously discussed with respect to the disk 34 of FIGS. 6 and 7.

In this embodiment, cone-shaped dimple 70 is molded into the polycarbonate substrate at the center point of the substrate. The dimple 70 is used to center the disk 62 within a read/write apparatus (not shown) in the same manner as the dimple 28 of FIG. 2. The card 64 is rotated about the cone-shaped dimple 70.

To affix the disk 62 within the card blank 64, the disk is set into the aperture 66. The disk has an outside diameter equal to or less than the diameter of the opening 66. A thin laminate layer 72 capable of bonding to both the card blank 64 and to the back side of the disk 62 is used to secure the disk 62 to the card blank 64.

Although the present invention has been described with reference to preferred embodiments, workers skilled in the art will recognize that changes may be made in form and detail without departing from the spirit and scope of the invention.

What is claimed is:

1. A data card comprising:
   a substrate having a magneto-optic active region configured for rotational recording of data; and
   first fender means for protecting the magneto-optic recording region disposed adjacent an outer circumference of the recording region.

2. The card of claim 1 and further including second fender means for protecting the magneto-optic active region disposed along an inner circumference of the recording region.

3. The card of claim 1 wherein the first fender means is a continuous ridge extending outwardly from the substrate.

4. The card of claim 2 wherein the second fender means is a continuous ridge extending outwardly from the substrate.

5. The card of claim 1 further comprising, as a centering means, a depression disposed on a center point of the magneto-optic active region for centering the magneto-optic active region during rotation.

6. The card of claim 1 wherein the first fender means extends outwardly from the substrate at least approximately 0.025 CM.

7. The card of claim 1 wherein the substrate includes a backing layer, a transparent top layer and a magneto-optic medium layer disposed between the backing, the top layer and at least a portion of the magneto medium layer being disposed within the magneto-optic active region.

8. A method of making a data card comprising:
   providing a rectangular substrate and an optical disk having a magneto-optic medium for recording of data in a magneto-optic active area, the disk being smaller in diameter than the width and length of the substrate;
   forming an area of the substrate sufficient in diameter to accept the disk and sufficient in depth such that a top surface of the disk is substantially even with a top surface of the substrate; and
   joining the disk to the substrate.

9. The method of claim 8 and further including:
   providing a first protruberance in the substrate adjacent the disk, the first protruberance means extending outwardly from the substrate a sufficient distance to provide protection to the magneto-optic active area.

10. The method of claim 9 wherein the first protruberance is a continuous ridge.

11. A method of making a data card comprising:
    providing a substrate having an aperture therein;
    providing an optical disk having a magneto-optic medium for recording of data in a magneto-optic active area, the disk having a diameter equal to or smaller in diameter than the aperture of the substrate:
    positioning the disk within the aperture; and
    fixedly attaching the disk to the substrate within the aperture.

12. The method of claim 11 and further including providing a protruberance means in the substrate adjacent the circumference of the aperture.

13. The method of claim 12 wherein the protruberance means includes a continuous ridge adjacent the aperture.

* * * * *